UNITED STATES PATENT OFFICE.

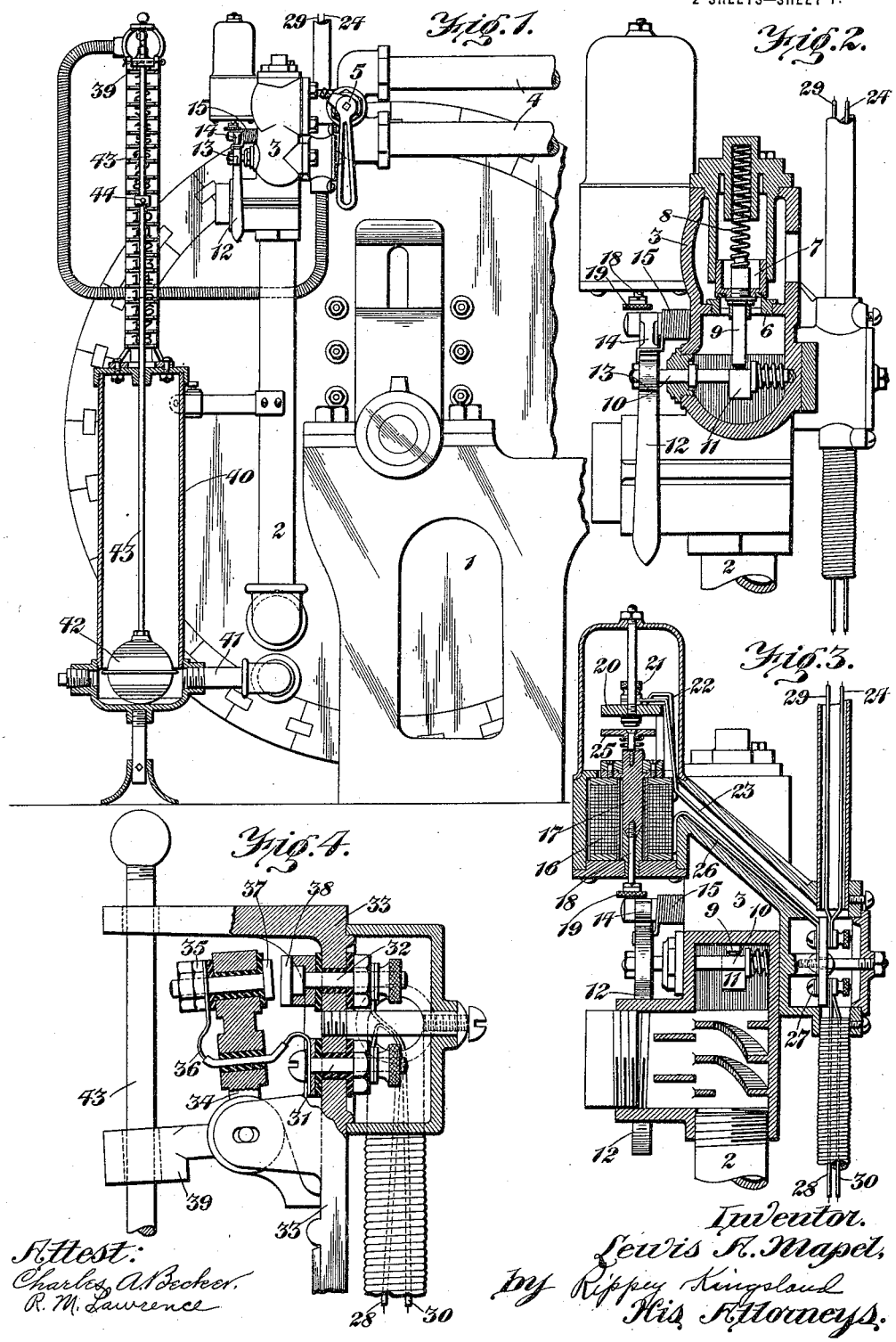

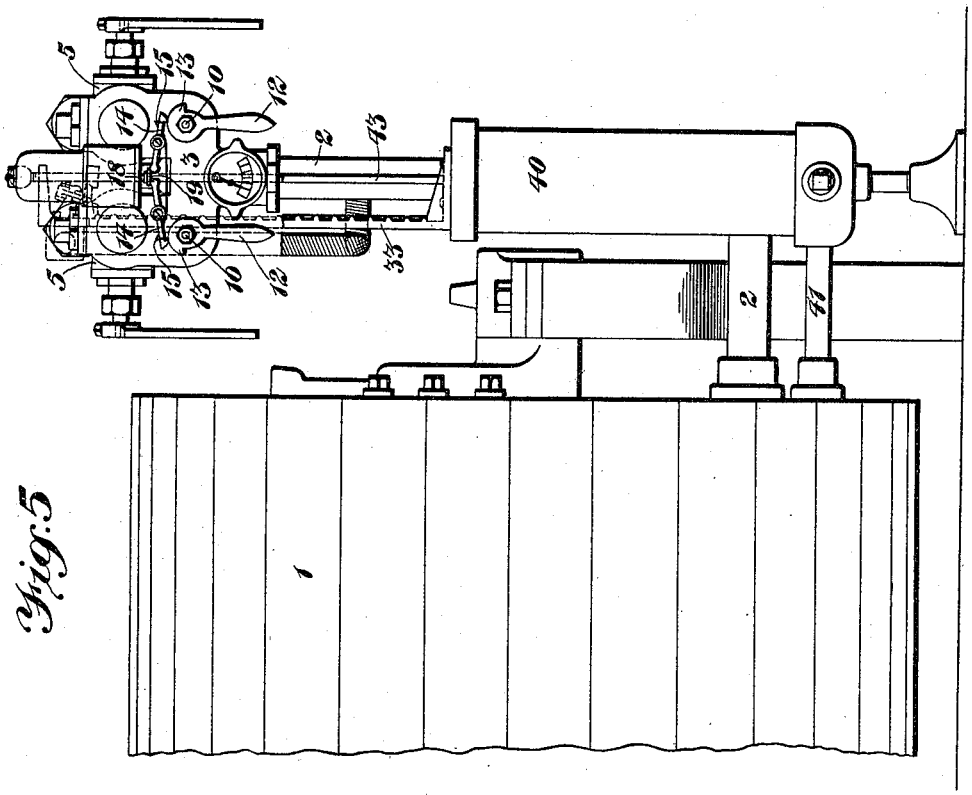

LEWIS A. MAPEL, OF ST. LOUIS, MISSOURI, ASSIGNOR TO MAPEL MANUFACTURING CO., OF ST. LOUIS, MISSOURI, A CORPORATION OF MISSOURI.

ELECTRIC VALVE-CONTROLLING MECHANISM.

1,179,540.  Specification of Letters Patent.  Patented Apr. 18, 1916.

Original application filed April 16, 1915, Serial No. 21,815. Divided and this application filed July 29, 1915. Serial No. 42,625.

*To all whom it may concern:*

Be it known that I, LEWIS A. MAPEL, a citizen of the United States, residing in the city of St. Louis and State of Missouri, have invented a new and useful Electric Valve-Controlling Mechanism, of which the following is a specification.

This invention relates to electric mechanism for controlling valves, and is a division of application Serial No. 21,815, filed April 16, 1915.

An object of the invention is to provide electric mechanism for controlling valves, which mechanism consists of an actuator which is energized by mechanism under control of the fluid which has passed through the valve effectively to enable the valve to close and thereby prevent passage of any more liquid therethrough, with provision whereby the actuator will become disabled or enervated as an incident to the closing of the valve.

Another object is to provide a valve for controlling the passage of fluid through a valve passage, and means for holding said valve open to enable a fluid to pass thereby, in combination with an actuator operable to release said holding means to enable said valve to close, mechanism under control of the fluid which has passed said valve whereby said actuator will be energized when a predetermined quantity of fluid has passed said valve, and means whereby said actuator will become disabled and disconnected from the source of energy as an incident to the closing of the valve as aforesaid.

A further object is to provide a valve actuator, in combination with means for energizing said actuator when a predetermined quantity of fluid has passed the valve, and means for disabling or disconnecting said actuator from a source of power as a consequence of the movement of said actuator when it is energized as aforesaid.

Various other objects of specific and general character will become apparent from the following detail description of one embodiment of the invention which I have illustrated in the accompanying drawings in which—

Figure 1 is a view illustrating my invention in complete form. Fig. 2 is a sectional view of the valve chamber, illustrating the device by which the valve is held open. Fig. 3 is a sectional view illustrating the magnet and armature which are energized and operated by mechanism under control of the fluid after it has passed the valve effectively to release the holding device to enable the valve to close. Fig. 4 is a detail view illustrating the mechanism under control of the fluid for energizing the actuator which releases and enables the valve to close. Fig. 5 is a front elevation of the device, the switch mechanism which is controlled by the float being shown in dotted lines. Fig. 6 is an enlarged front view of the float-controlled switch device.

I have illustrated my invention in connection with a liquid receptacle 1. Liquid is admitted into the receptacle 1 through a passage 2 communicating with a valve chamber 3, constructed and arranged to receive liquid from a number of supply passages 4, the admission of the liquid into the chamber 3 from the passages 4 being controlled by a valve 5. A valve seat 6 is arranged within the chamber 3, and a valve 7 is movable to and from said valve seat to close and open the passage through the chamber. A spring 8 of the expansion type is supported within the valve chamber and presses against a part of the valve effectively to retain said valve normally in closed adjustment and to actuate said valve to closed adjustment as hereinafter explained. The valve 7 is provided with a stem 9 which terminates adjacent to a rod 10 extending transversely of the valve chamber and provided with a cam 11 whereby the valve may be moved to open position in opposition to the spring 8. A member 12 is attached to the outer end of the rod 10 and is provided with a shoulder 13 which is movable into engagement with a hook on the end of a lever 14, whereby the rod 10 will be held in position to hold the valve 7 open. A spring 15 engages the lever 14 and presses the hooked end thereof against the shoulder 13, so that it requires positive means for disengaging the lever 14 from said shoulder 13. My present invention consists of mechanism under control of the fluid which has passed the valve for energizing and causing an actuator to move to release the lever 14 from the shoulder 13 and thereby enable the spring 8 to close the valve, including provision whereby the actuator will become disabled or disconnected from the source of energy as an incident to its operation to release the valve holding device.

In the embodiment illustrated the actuator comprises an electromagnet 16 and its armature 17. The armature 17 is vertically movable, and is actuated downwardly when the magnet is energized. A small rod 18 is connected to the lower end of the armature and extends through the armature support and is provided on its lower end with a member 19 adapted to contact with the free end of the lever 14 and to press the same and thereby disengage said lever from the shoulder 13, thus enabling the valve 7 to be closed by the spring 8. A support 20 is carried above the armature and supports two binding posts 21 having their terminals below and insulated from said support 20. A wire 22 leads from one of said posts to the electromagnet 16, and a wire 23 leads from the other binding post to a connection in circuit with a wire 24. The upper end of the armature 17 carries a contact plate 25 which is movable into contact with the terminals of the posts 21. When the member 12 is adjusted into engagement with the lever 14 to hold the valve open the plate 25 is supported in contact with the contact members of the posts 21, so that said plate constitutes a connection between said terminals of said posts. The wire 26 leads from the magnet coils to a connection 27 in circuit with a wire 28. Another wire 29 is in circuit with a wire 30, so that it is necessary to switch the wires 28 and 30 into the same circuit in order to bring the wires 23 and 26 into the same circuit so as to energize the magnet. The mechanism for bringing the wires 28 and 30 into the same circuit is controlled by the liquid which has passed the valve, and the controlling device may be regulated or adjusted so as to be operated by any desired predetermined quantity of liquid. It will be understood that when the electromagnet is thus energized the armature 17 is actuated downwardly, releasing the lever 14 from its engagement with the shoulder 13, thus enabling the actuating spring 8 to close the valve and prevent further flow of the liquid thereby.

The wire 28 leads to a binding post 31, while the wire 30 leads to a binding post 32, both of which binding posts are carried by a support 33. A switch member 34 is pivotally supported by the support 33 and has a binding device thereon. A wire 36 leads from the binding post 31 to the binding device 35, and the binding device 35 is provided with a terminal contact member 37 which is movable into and out of contact with the terminal contact member on the binding post 21. In this manner the wires 28 and 30 are brought into the same circuit with each other and with the wires 23 and 26, thus energizing the magnet 16 effectively to actuate the armature 17 downwardly thereby releasing the lever 14 and enabling the valve to be closed by the valve actuating spring 8. This downward movement of the armature also carries the plate 25 out of contact with the contact members on the lower ends of the binding posts 21, thus disabling or removing the actuating member 17 from the control of the energizing power. The contact member 37 is normally retained out of contact with the member 38 by a weighted arm 39.

A fluid chamber 40 has a passage 41 opening into the container 1, so that the fluid is maintained at the same level in the chamber 40 as it is in the container 1. A float 42 within the chamber 40 rises and falls with the level of the fluid therein, in the usual manner. A rod 43 connected to said float extends upwardly through suitable guides, and through a hole in the arm 39. An element 44 is adjustable on the rod 43, so that said element will contact with the arm 39 and thereby close the circuit as above explained, under control of the fluid entering the container 1 and the chamber 40. The support 33 contains a scale for guidance in adjusting the element 44, so that the quantity of liquid which will enter the container 1 before operation of the valve may be conveniently and accurately determined.

From the foregoing it will be understood that the valve 7 may be manually opened, and will be retained open by engagement of the lever 14 with the shoulder 13, and that the magnet will be energized when the contact members 37 and 38 are brought together to complete the circuit. Further, the amount of liquid required to complete the circuit may be varied optionally and at the will of the operator by placing the element 44 in the desired position on the rod 43. The circuit becomes immediately broken as a result of the movement of the armature to release the lever 14, and out of contact with the contact members on the lower ends of the posts 21.

It will be understood that there may be variations and modifications in the construction and arrangement of the different parts of the invention without departure from the spirit and scope thereof. Therefore, I do not restrict myself to specific features except where specified in the appended claims, but

What I claim and desire to secure by Letters Patent is—

1. The combination with a valve, an actuator for moving said valve toward closed position, a device for moving said valve to open position and energizing said actuator, and an element arranged to hold said valve open in opposition to said actuator, of an additional actuator which is normally deenergized and which when energized is operable to release said element to enable said valve to close, a device supported by said element in position to enable said additional actuator to be energized, and mechanism under control of the liquid that has passed said valve operable to energize and enable said additional actuator to operate said device to release said element.

2. The combination with a puppet valve, an actuator for moving said valve toward closed position, a device for moving said valve to open position and energizing said actuator, and an element arranged to hold said valve open, of an additional actuator which is normally deënergized, a device supported by said element in position to enable said additional actuator to be energized, and electric mechanism under control of the fluid that has passed said valve for energizing and causing said additional actuator to operate said device to release said element and enable said valve to close.

3. The combination with a puppet valve, an element for holding said valve open, and an actuator for moving said valve to closed position, of a normally deënergized electro-magnet, an armature under control of said magnet supported by said element in position to enable said magnet to be energized and movable as an incident to energization of said magnet to release said element and enable said valve to close, mechanism under control of the fluid that has passed said valve to energize said magnet, and means for varying the amount of fluid that will operate said mechanism to energize said magnet.

4. The combination with a valve case, a valve within said case, an actuator within said case for actuating said valve to closed position, a device for moving said valve to open position, and an element arranged to engage said device to hold said valve in open position, of an additional normally deënergized actuator, an armature supported by said element in position to enable said actuator to be energized when said element is in engagement with said device, and mechanism under control of the fluid that has passed said valve for energizing and causing said additional actuator to actuate said armature to position to disengage said element from said device and also to deënergize said additional actuator.

5. The combination with a valve case, a puppet valve in said case, an actuator in said case holding said valve on its seat, a device movable to actuate said valve from its seat and to energize said actuator, a lever arranged to engage said device and thereby holding said valve from its seat, and a spring holding said lever in engagement with said device, of a normally deënergized electro-magnet, a circuit for energizing said magnet, an armature supported by said lever in position to enable said magnet to be energized by said circuit when said lever is in engagement with said device, and mechanism under control of the fluid that has passed said valve for energizing said magnet through said circuit and causing said magnet to operate said armature to position to disengage said lever from said device and to open said circuit to deënergize said magnet.

6. The combination with a valve, and an element for holding said valve open, of an actuator, a device supported by said element in a position to enable said actuator to be energized, mechanism under control of the fluid that has passed said valve whereby said actuator will be energized after a predetermined quantity of fluid has passed said valve, said device being moved by said actuator as an incident to energization to position to deënergize said actuator.

7. The combination with a valve, an actuator for closing said valve, and an element for holding said valve open, of an additional actuator, a device supported by said element in position to enable said additional actuator to be energized, and mechanism under control of the fluid that has passed said valve for energizing said additional actuator effectively to move said device to position to disable said actuator and to release said element to enable said valve to close.

8. The combination with a valve 7, a lever 14 for holding said valve open and a device for closing said valve when said lever is released, of a normally deënergized electro-magnet, a normally open electric circuit for energization of said magnet, an armature supported by said lever in position to close said circuit to enable said magnet to be energized, and movable as an incident to energization of the magnet to position to open the circuit and to release said lever to enable said valve to close, and mechanism under control of the fluid that has passed said valve determining when said magnet will be energized and said armature operated as aforesaid.

9. The combination with a valve, a manually operable device for opening said valve and a lever engageable with a part of said device to hold said valve open, of a normally deënergized electromagnet, a normally open electric circuit, an armature supported by said lever when in engagement as aforesaid in position to close said circuit and movable as an incident to the energization of said magnet to position to open said circuit and to release said lever, a normally open switch in said circuit, and mechanism under control of the fluid that has passed said valve for closing said switch to enable said magnet to be energized through said circuit.

10. In a fluid regulating device, two adjacent receiving chambers, a valve within each of said chambers, valve stems on said valves, rods operatively supported below said valve stems, cams on said rods for engaging said valve stems to open said valves when said rods are turned, means for turning said rods, elements for engaging and holding said rods in position to hold said valves open, an actuator operable to disengage both of said elements to permit said valves to close at the same time, a receptacle for fluid passing from said chambers, an electro-magnet for moving said actuator, a circuit for energizing said magnet, and a device under control of the fluid that has passed said valves for closing said circuit when a predetermined quantity of fluid enters said receptacle.

In witness whereof, I have signed this specification in the presence of two subscribing witnesses.

LEWIS A. MAPEL.

Witnesses:
N. G. BUTLER,
JOHN D. RIPPEY.

Copies of this patent may be obtained for five cents each, by addressing the "Commissioner of Patents, Washington, D. C."